Jan. 24, 1956     P. H. MacMAHON     2,732,540
BICYCLE LIGHTS
Filed Jan. 21, 1955     2 Sheets-Sheet 1
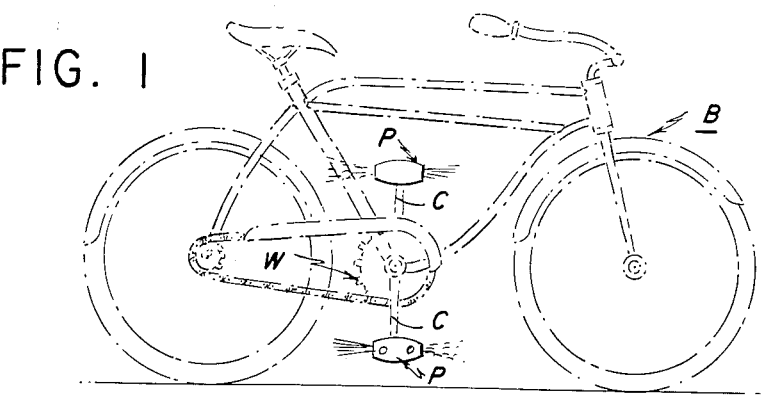
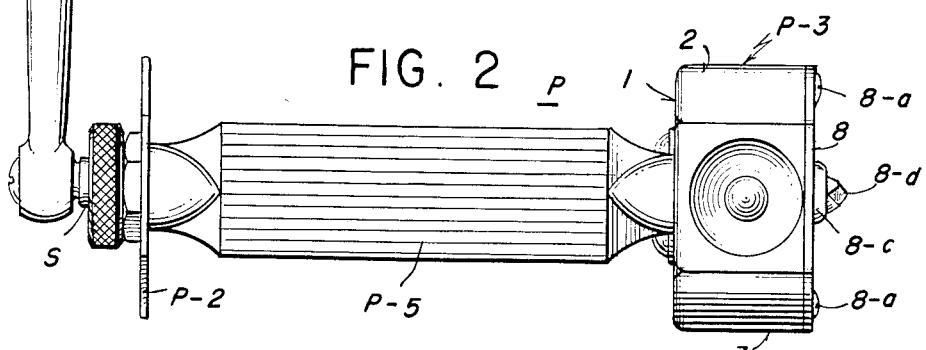
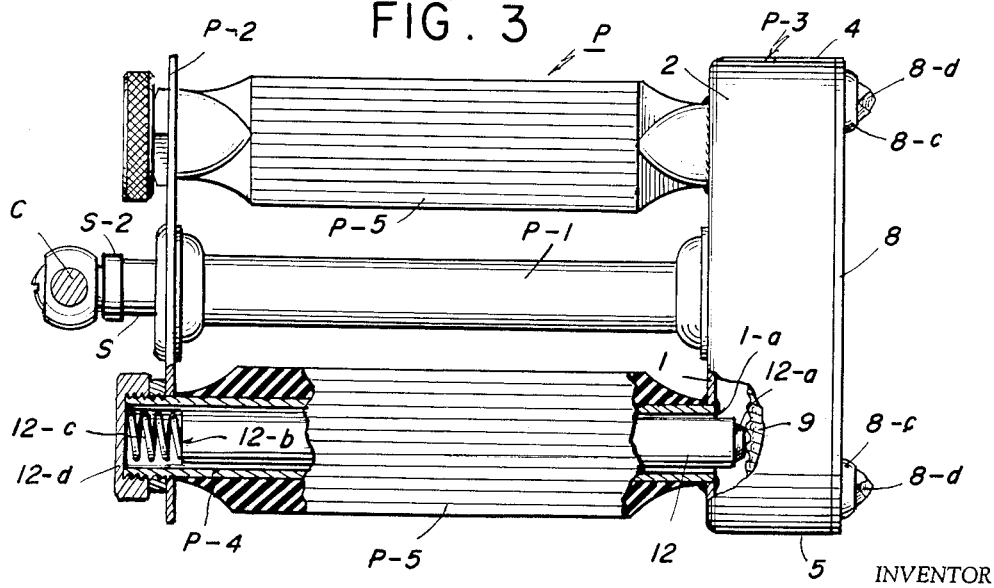
INVENTOR
Paul H. MacMahon
BY *Ogle R. Singleton*
ATTORNEY

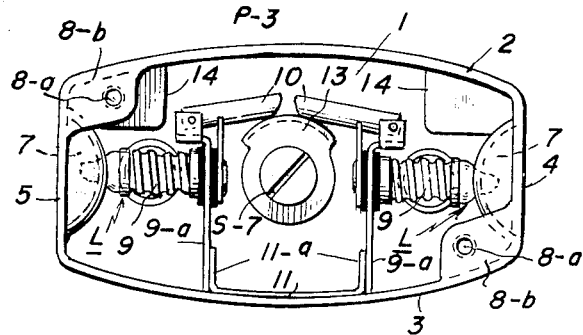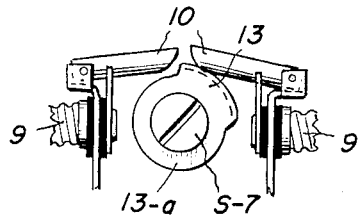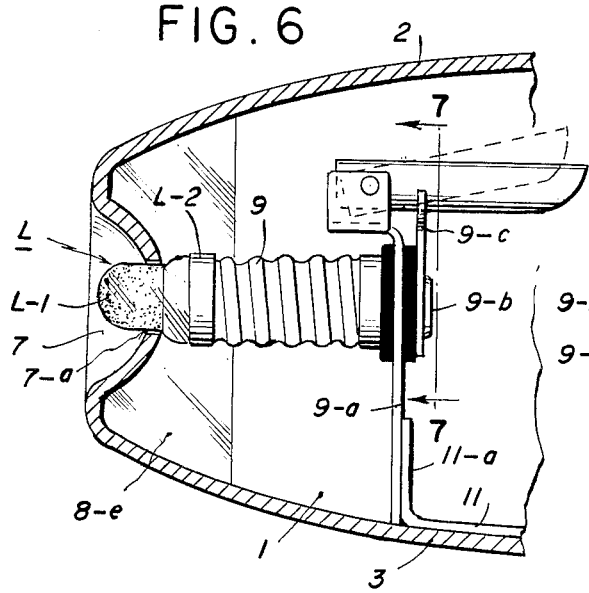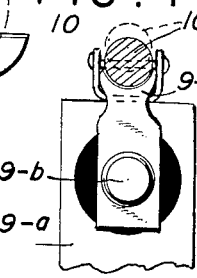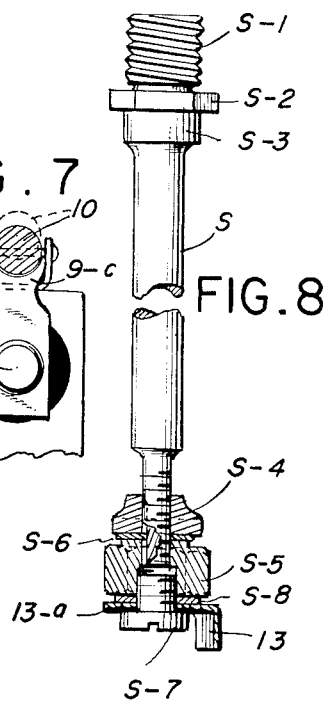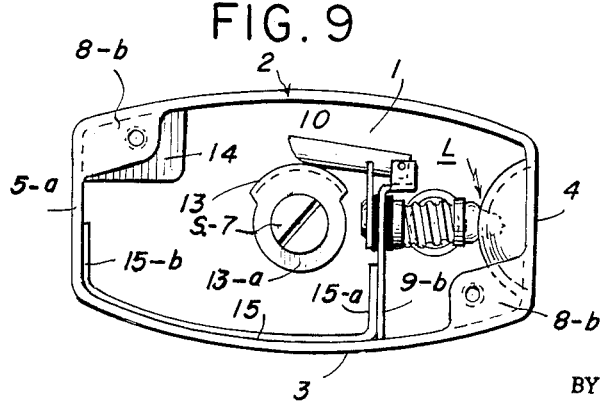
INVENTOR
Paul H. MacMahon
BY Ogle P. Singleton
ATTORNEY

United States Patent Office 2,732,540
Patented Jan. 24, 1956

2,732,540

BICYCLE LIGHTS

Paul H. MacMahon, Alexandria, Va.

Application January 21, 1955, Serial No. 483,403

8 Claims. (Cl. 340—87)

My invention consists in a new and useful improvement in bicycle lights to provide means for displaying an oscillating and flashing white and red light, fore and aft, respectively. The invention disclosed and claimed in this application is an improvement upon the one disclosed and claimed in my co-pending application Serial Number 308,767, filed on September 10, 1952.

My improved device comprises a casing to be mounted on the bicycle pedal, a pair of units, each of which consists of a lamp, its socket and its switch, and a locking member to retain the units in the casing. I also provide a battery for each lamp and I have devised a new, simple and efficient electrical circuit for the battery and the lamp. A particularly valuable feature of my improved device is an adjustable cam removably mounted on the pedal-carrying shaft of the bicycle, for control of the circuits for producing the desired flashing of the lamps.

Simplicity, in manufacture and assembly, and replacement of parts have been achieved through the lamp holder unit with an integral bracket stand and a thrust spring which provides for snapping into place in the casing of the complete unit, and also for its quick removal whenever a lamp has to be replaced.

By means of my novel circuit, I have eliminated contact wires and reduced insulation parts for component parts of the device. Battery storage is free from extra parts, permitting cleaning of the battery-receiving tubes or the clearing of the batteries should any become swollen.

Full use of or part use of a reflector in the casing by mounting the lamp bulb from the inside of the casing is effected. Inside bulb mounting with the spring thrust unit allows use of one light, if desired, by thrusting its dead end up against the casing, or use of both lights by shortening the spring thrust unit to act between the two lamp units.

By allowing the glass portion of the bulb to protrude from the inside of the casing from its self-contained unit, instead of inserting the bulb from outside of the casing to an inside rigid unit, produces secure anchorage of the lamp unit, forming a right-angle triangular unit, through an up-thrust exerted by a spring clip, such thrust being counter-balanced by the reflector hole receptacle engaging the periphery of the glass portion of the lamp bulb. This structure provides a positive lock and not liable to become misaligned. Moreover, the bulb so anchored is water-tight and in the case of the tail-light allows painting of only the outer end of the bulb red, and the use of the rest of the glass portion which is disposed within the casing as a translucent medium for passage of white light into the casing. Since exhaustive tests of my improved device have shown that my device's beam of light is produced by the proper focusing of the lens end of the bulb, the portions of both the tail light (which is clear) and the headlight (all clear) is used for side lighting through red "scatter lights" mounted on the outer cover of the casing. This effect can be enhanced by painting the inner surface of the casing with reflecting material, thus adding a very useful and desirable feature of side lighting for cross traffic.

Since no two bicycle pedals will seat on the pedal crank in precisely the same manner (in relation to a complete circle of the pedal), my improved combination of pedal lock nut and adjustable cam allows the lock nut to seat home at any degree and then setting the cam at any desired degree, thus insuring positive setting of the cam at all times on any and all bicycles, so that the warning lights come on at precisely 350° and go off at 190°, which will always provide a trifle more than a complete half-circle of oscillating safety light, always within the range where the full impact of correct focusing of the lens end of the bulb cannot fail to occur.

While I illustrate in the drawings and hereinafter fully describe one specific embodiment of my invention, it is to be distinctly understood that I do not consider my invention to be limited to said specific embodiment but refer for its scope to the claims appended hereto.

In the drawnigs:

Fig. 1 is a side elevation of a bicycle equipped with a pair of pedals having my improved signal lights.

Fig. 2 is an enlarged front elevation of one of the pedals mounted on its crank of the bicycle.

Fig. 3 is a top plan of the pedal, the parts being broken away.

Fig. 4 is a side elevation of the casing, the cover being removed, the parts being shown in positions to open the circuits of the two lamps.

Fig. 5 is a fragmentary side elevation of the switches, the parts being in positions to open and close the circuits of the two lamps, respectively.

Fig. 6 is a greatly enlarged vertical section of one of the lamps, its socket and its switch, the switch arm being shown in closed position in solid lines and in open position in broken lines.

Fig. 7 is a vertical section on the line 7—7 of Fig. 6.

Fig. 8 is a plan, partly in section, of the pedal-carrying shaft and the operating cam mounted thereon.

Fig. 9 is a view similar to Fig. 4 showing a modified form of my device.

As shown in the drawings, my improved device is provided for a bicycle B (Fig. 1) having the ordinary cranks C on the sprocket wheel W, each crank C having removably mounted on its end a pedal-carrying shaft S (Figs. 2, 3 and 8).

My device comprises pedals P (Figs. 2 and 3) journaled on the shafts S, respectively. Each pedal P has the usual sleeve P–1 rotatable on the shaft S, the end plate P–2 on the inner end of the pedal P and a casing P–3 on the outer end, the plate P–1 and the casing P–3 being suitably mounted on the sleeve P–1. A pair of suitable tubular members P–4 disposed on the sides of the sleeve P–1, respectively, are mounted in the plate P–2 and the casing P–3 and carry the rubber treads P–5.

The casing P–3 has an inner wall 1 (Figs. 3 and 4) mounted on the sleeve P–1, and in which are mounted the outer ends of the tubular members P–4. The wall 1 has a hole 1–a to connect the bore of each member P–4 with the interior of the casing P–3. The wall 1 also has a passage through which the outer end of the shaft S passes into the casing P–3. The casing P–3 has a top wall 2, a bottom wall 3 and end walls 4 and 5 (Fig. 4). It will be noted that the walls 2 and 3 are slightly arcuate. Each end wall is provided with a suitable lamp-receiving, hemi-spherical depression 7 having a central bore 7–a. An outer wall 8 (Figs. 2 and 3) for the casing P–3 is removably mounted by bolts 8–a tapped into ears 8–b suitably provided on the walls 2 and 3.

The wall 8 has a pair of windows 8–c in which are disposed suitable translucent panes 8–d for a purpose presently to be explained.

A pair of electric lamps L are disposed in the depressions 7, respectively. Each lamp L comprises a glass bulb L–1 seated in the bore 7–a of the depression 7, and a metallic base L–2 which is threaded into a metallic sleeve 9 which is mounted upon and insulated from a post 9–a. It is to be understood that one of the leads from the lamp L is thereby electrically connected with the sleeve 9 and insulated from the casing P–3. The other lead from the lamp L is brought into electrical contact with a plate 9–b carried by and insulated from the post 9–a, when the base L–2 is seated in the sleeve 9. The plate 9–b has a concave, contact member 9–c with which a switch arm 10 hinged on top of the post 9–a and grounded on the pedal P, co-acts to open and close the circuit of the lamp L.

A suitable resilient locking member 11 is provided to removably mount the lamps L in the casing P–3. As shown in Fig. 4, the bulbs L–1 are inserted through the bores 7–a, the posts 9–a are seated on the bottom wall 3, and the legs 11–a of the member 11 urging the posts 9–a outwardly along the curved inner surface of the wall 3 lock the lamps L in proper positions so that the glass bulbs L–1 contact the casing P–3.

As shown in Fig. 3, I provide a suitable battery 12 in each of the tubular members P–4, having one lead 12–a passed through the hole 1–a in the wall 1 of the casing P–3 and contacting the metallic sleeve 9 of the lamp L. The other lead 12–b is grounded on the pedal P by spring 12–c and screw cap 12–d.

As shown in Fig. 8, I provide a removably mounted cam 13 on the pedal-carrying shaft S for operating the switch arms 10. The adjustability of this cam 13 relative the shaft S providing means for the precise determination of the flashing periods of the lamps L is a particularly valuable feature of my device.

The shaft S has the usual threads S–1 and hex-head S–2 for setting up the shaft S on the crank C, and also has the usual fixed ball-race S–3 and the adjustable ball race S–4 for properly mounting the pedal P on the shaft S. I provide a locking nut S–5 with a suitable washer S–6. This nut S–5 is of sufficient length that, when it is properly set up on the threaded outer end of the shaft S to mount the pedal P, a threaded socket is provided to receive a bolt S–7 to bind the collar 13–a of the cam 13 against a washer S–8 on the outer end of the nut S–5. As clearly shown in Fig. 4, the cam 13 is suitably dimensioned to produce the desired periods of flashing.

It will be noted (Fig. 6) that a portion of the translucent glass bulb L–1 is disposed within the casing P–3 when the lamp L is installed. The light passing through this portion illuminates the pane 8–d which is suitably disposed for this purpose, thereby producing a "scatter light" for side lighting of the pedal P. To enhance this effect, the adjacent portions of the walls 1, 2 and 3 may be treated with a suitable coating 8–e.

I provide weights 14 on the inner side of the wall 2 to cause the pedal P to assume a normal position opposite to that shown in Fig. 4, so that the switch arms 10 fall by gravity away from the contact members 9–c, to render the device inoperative when the bicycle is not in use or is used in day light.

The modified form of the device, shown in Fig. 9, has a single lamp L with its associated mechanisms. It is locked in place by a resilient member 15 having an arm 15–a bearing against the post 9–a and an arm 15–b bearing against a solid wall 5–a.

Having described the details of construction of my device, I will now describe its use and operation. The shaft S is mounted on the crank C and the pedal P is mounted on the shaft S. The lamps L with their brackets and switches having been disposed in the casing P–3 and locked in place by member 11, and the batteries 12 having been disposed as above described, there remains only the adjustment of the cam 13. The pedal P is then positioned as shown in Fig. 1 and turned from its normal position to the position shown in Fig. 4. The collar 13–a of the cam 13 is rotated about the nut S–7 to adjust the cam 13 to the position shown in Fig. 5 and the nut S–7 is set up to lock the cam 13 in adjusted position. The wall 8 is then mounted on the casing P–3.

Propelling the bicycle B by pressure on the pedals P causes the shaft S to rotate relative the pedals P, thus moving the cam 13 under the arms 10. As the cam 13 touches one of the arms 10 it is lifted (dotted lines in Fig. 6), moving away from its contact member 9–c (Fig. 7), breaking the circuit and causing the lamp L to go out. As the cam 13 moves away from the arm 10, the latter falls by gravity onto the contact member 9–c to close the circuit and light the lamp L.

It is obvious that as pedal P rotates the lamp L rises and falls and that during its period of illumination its light oscillates. As above explained, the parts are so dimensioned and related as to cause each lamp to provide a trifle more than a complete half circle of oscillating safety light.

Having described my invention, what I claim is:

1. In a bicycle light, the combination of a casing so mounted on a pedal journaled on a pedal-carrying shaft of the bicycle as to be moved by the pedal in a circular orbit, said shaft moving in said orbit and being rotated in said casing by said movement; a cam adjustably mounted on said shaft; an electric lamp removably mounted in said casing; an electric battery on the pedal; an electric circuit connecting said lamp and said battery; and a reciprocable switch arm pivoted in said casing and adapted to open and close said circuit, said arm being reciprocated by said cam by rotation of said shaft.

2. In a bicycle light, the combination of a casing on a pedal journaled on a pedal-carrying shaft of the bicycle, said shaft being rotatable in said casing; an electric lamp removably mounted in said casing; an electric battery on the pedal; an electric circuit connecting said lamp and said battery; a reciprocable switch arm pivoted in said casing and adapted to open and close said circuit; and a cam adjustably mounted on said shaft for reciprocating said switch arm by rotation of said shaft, said cam being operative and inoperative when the casing is positioned relative said pedal to dispose said switch arm above and below said shaft, respectively.

3. In a signalling device for a bicycle having a pedal journaled on a pedal-carrying shaft, the combination of an electric lamp removably mounted on the pedal; an electric battery on the pedal; an electric circuit connecting said lamp and said battery; a reciprocable switch arm pivoted on said pedal and adapted to open and close said circuit; and a cam adjustably mounted on said shaft for reciprocating said switch arm, on rotation of the shaft relative to the pedal.

4. In a signalling device for a bicycle having a pedal journaled on a pedal-carrying shaft, said shaft rotating relative to the pedal when the bicycle is propelled by the pedal, the combination of an electric lamp removably mounted on the pedal; an electric battery on the pedal; an electric circuit connecting said lamp and said battery; a reciprocable switch arm, in said circuit, pivoted on the pedal, and adapted to be moved by gravity into and out of contact with said shaft, when the pedal is in two positions relative said shaft; and a cam so projecting radially from said shaft as to move said arm to close and open said circuit, when said arm has been moved into contact with said shaft, and said shaft is rotated relative said pedal.

5. A bicycle light, according to claim 1, comprising an electric bulb having two leads, and said circuit comprising a connection of one of said leads to one side of said battery, a connection of the other lead to a contact member, and grounding of said switch arm and the other side of said battery, said arm co-acting with said contact member.

6. A bicycle light, according to claim 1, in which said light comprises an electric bulb and a base in which said bulb is removably disposed, said bulb being partially inserted outwardly through one wall of said casing and said base is supported in said casing by another wall of said casing, and a resilient locking member bears against said base to lock said lamp in said casing.

7. A bicycle light, according to claim 1, in which said cam has a collar encircling the shaft and a bolt is mounted on the end of the shaft and engages said collar with the shaft.

8. A bicycle light, according to claim 1, in which said casing has a side window provided with a translucent pane, and said lamp is so disposed in said casing as to provide light rays passing through said pane.

No references cited.